United States Patent [19]
Pennington

[11] Patent Number: 5,186,526
[45] Date of Patent: Feb. 16, 1993

[54] ONE-PIECE CRAWLER PAD

[75] Inventor: John H. Pennington, Green River, Wyo.

[73] Assignee: General Chemical Corporation, Parsippany, N.J.

[21] Appl. No.: 856,807

[22] Filed: Mar. 24, 1992

Related U.S. Application Data

[63] Continuation of Ser. No. 576,370, Aug. 31, 1990, abandoned.

[51] Int. Cl.$^5$ .............................................. B62D 55/25
[52] U.S. Cl. ........................................ 305/39; 305/54; 305/40; 198/731
[58] Field of Search ............... 305/26, 35 R, 38, 39, 305/40, 54; 198/300, 303, 861.2, 730, 731

[56] References Cited

U.S. PATENT DOCUMENTS

| | | | |
|---|---|---|---|
| 1,446,712 | 2/1923 | McMillan et al. | 305/40 X |
| 2,063,762 | 12/1936 | Schultz | 305/40 |
| 2,278,853 | 4/1942 | Hudson | 198/731 |
| 2,977,158 | 3/1961 | Iblings | 305/54 X |
| 4,113,084 | 9/1978 | Temme | 198/731 |
| 4,320,620 | 3/1982 | Rieger et al. | 198/731 X |
| 4,586,757 | 5/1986 | Bloechlinger | 305/54 X |
| 4,705,325 | 11/1987 | Oerding | 305/38 X |
| 4,742,904 | 5/1988 | Miller | 198/861.2 X |
| 4,828,339 | 5/1989 | Thomas et al. | 305/39 |
| 4,846,092 | 7/1989 | Wilson | 305/54 X |

FOREIGN PATENT DOCUMENTS 1093603  5/1984  U.S.S.R. .................. 305/39

*Primary Examiner*—Russell D. Stormer
*Attorney, Agent, or Firm*—Brumbaugh, Graves, Donohue & Raymond

[57] ABSTRACT

A one piece crawler pad has a substantially rectangular body portion having first and second narrow ends and first and second major surfaces. The interior space of a centrally located protrusion is sized to receive a portion of a chain link. Bolts passing horizontally through the central protrusion affix the crawler pad to the chain link.

3 Claims, 5 Drawing Sheets

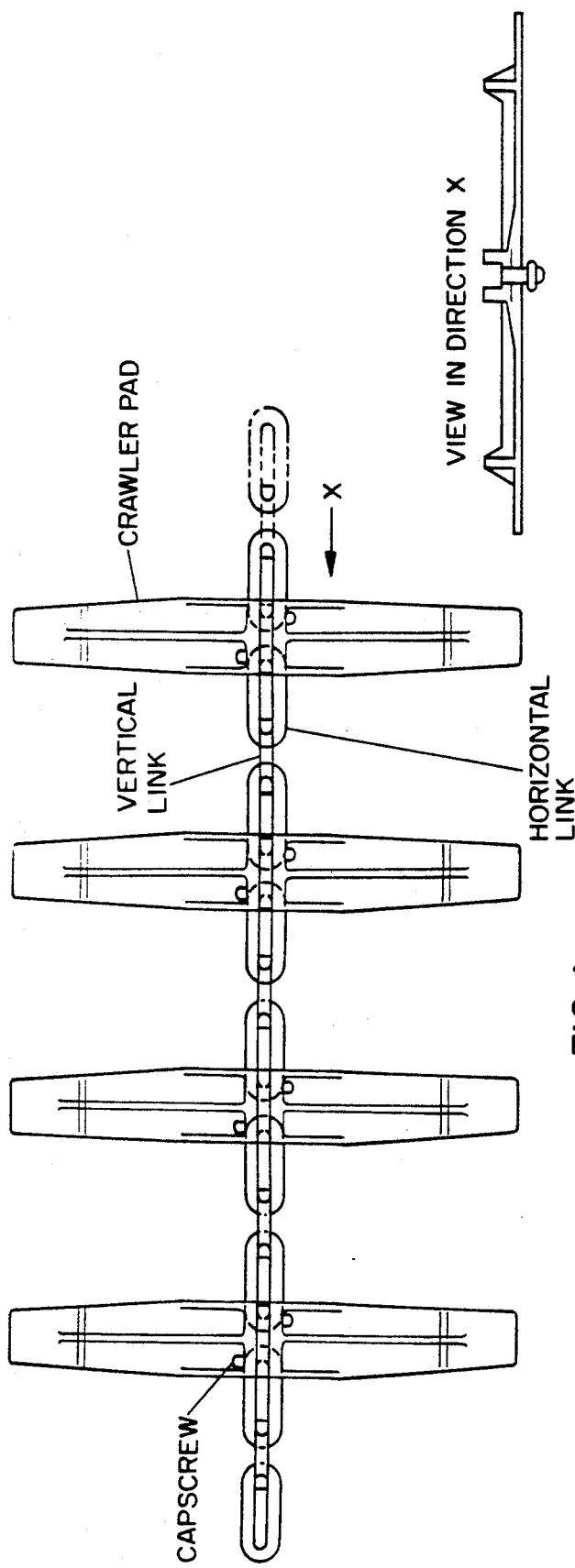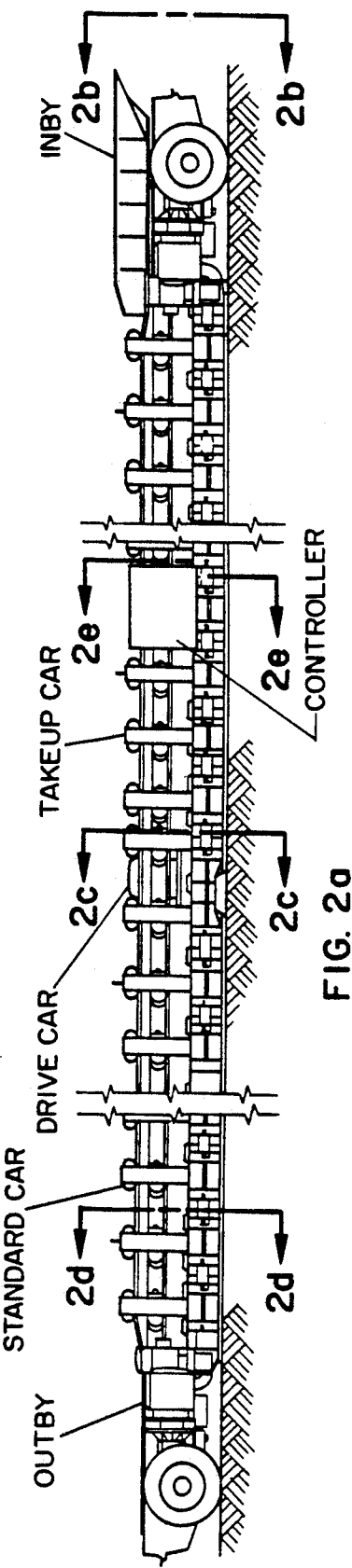

ONE-PIECE CRAWLER PAD

This application is a continuation of application Ser. No. 07/576,370, filed on Aug. 31, 1990 now abandoned.

BACKGROUND OF THE INVENTION

The present invention relates to a crawler pad for use in a mining machine. In the mining field it is necessary to have machines capable of transporting materials within mine tunnels. These machines generally comprise a large bin mounted on a transport means which consists of a number of crawler pads connected to a drive chain. The operation of one of these mining machines is much like a tank. When the drive chain is rotated the crawler pads dig into the ground and the machine moves.

Previously, the crawler pads which propelled the machine were two piece structures (see FIG. 1a). These prior art pads consist of two separate, identical pieces, both of which must be fixed to the drive chain, parallel to the ground at a substantially 90° angle to the drive chain, extending outwards on opposite sides of the drive chain. As shown in FIG. 1(a), this was accomplished using a capscrew which affixed the two crawler pad segments to the drive chain. This two piece arrangement has one major problem. It is not durable. The two piece arrangement requires the joinder of the two halves against extremely high stress. Because of this the pads break frequently at the tram chain connection point. This results in significant repair expenses and machine downtime. Accordingly, it is an object of the present invention to alleviate the above-described problems.

SUMMARY OF THE INVENTION

In accordance with the present invention a one-piece crawler pad which extends outwardly on both sides of the central drive chain is disclosed. A one-piece crawler pad requires only one pin connection to the drive chain. This arrangement does not subject, the pad and pin attachment to extremely high stress as in the prior art. Therefore it is much less likely to break. This results in savings in repair costs and machine downtime.

BRIEF DESCRIPTION OF THE DRAWINGS

FIG. 1a is a vertical view of a section of a drive chain using two-piece crawler pads.

FIG. 1b is a horizontal view of a two-piece crawler pad.

FIG. 2a is a horizontal view of a mining machine.

DESCRIPTION OF THE PREFERRED EMBODIMENT

Figure 2B:
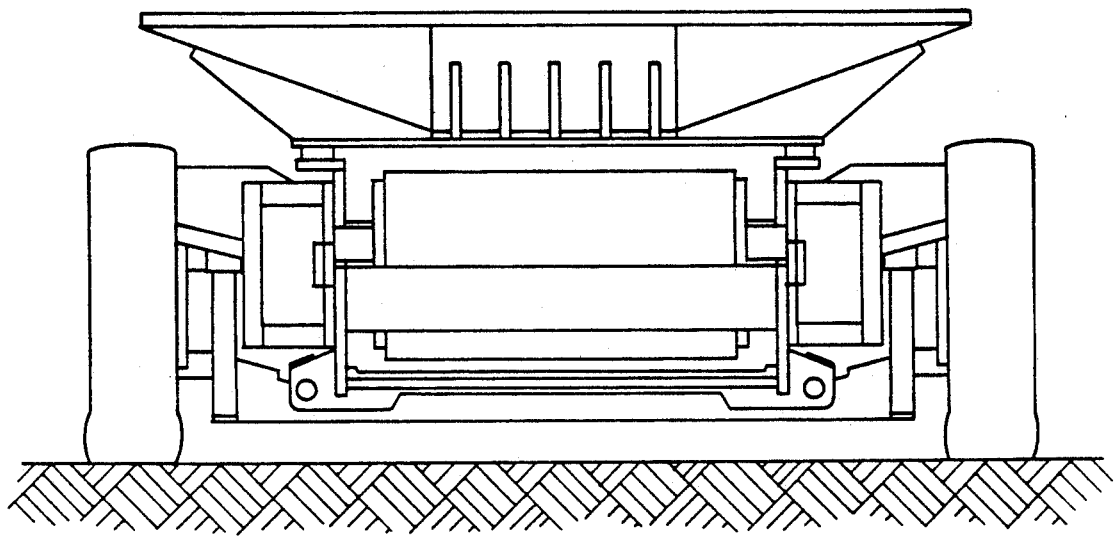
FIG. 2b is a view of the front of a mining machine.
Figure 2C:
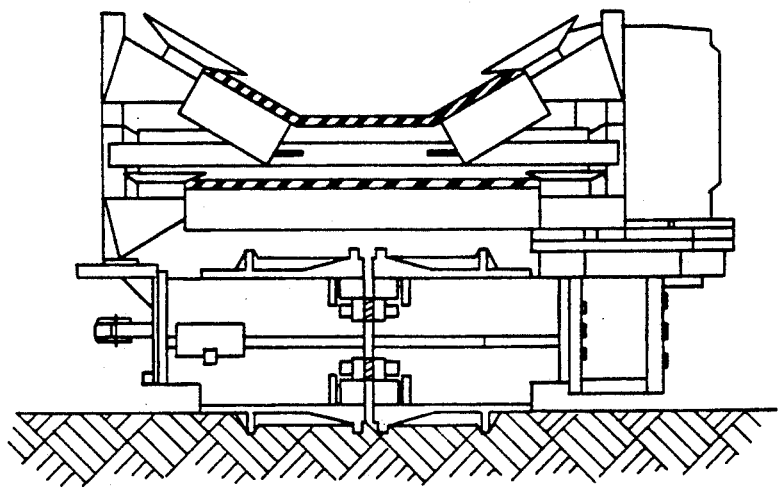
FIG. 2c is a cross-sectional view of a mining machine at the drive car location.
Figure 2D:
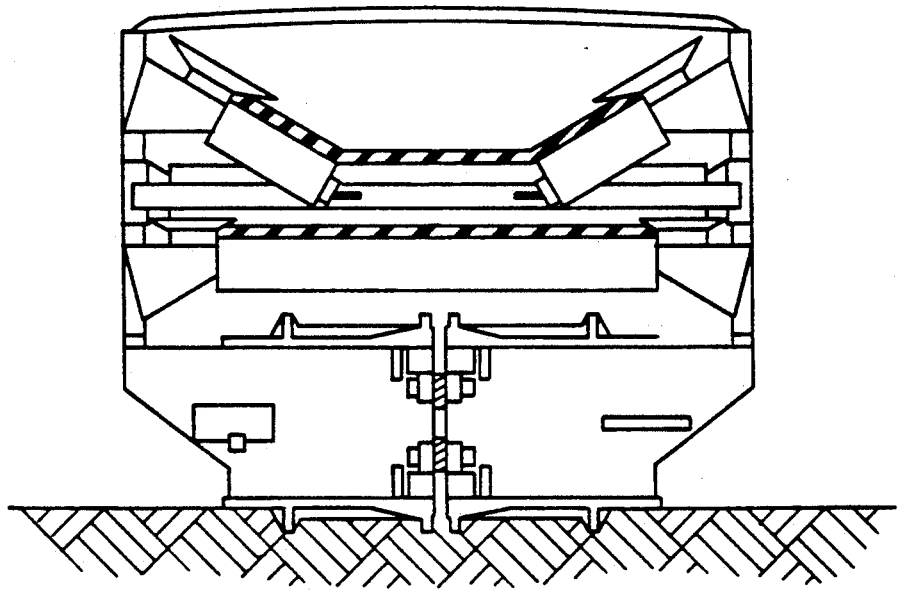
FIG. 2d is a cross-sectional view of a mining machine at the standard car location.
Figure 2E:
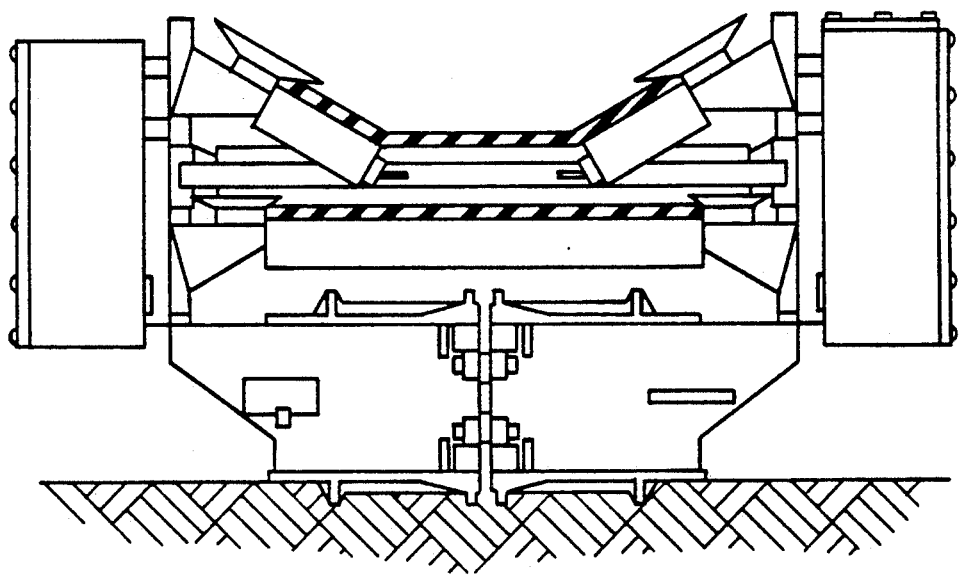
FIG. 2e is a cross-sectional view of a mining machine at the controller location.

Referring to FIG. 3 a–b, a preferred embodiment of a one-piece crawler pad will be described. FIG. 3b shows a one piece crawler pad comprising a body portion 1, a surface engaging portion 2 and a drive chain engaging means 3. The drive chain engaging means of this embodiment is formed in a central protrusion 4 of the surface engaging portion. It comprises two holes on opposite sides of the central protrusion. The two holes are configured such that a bolt or pin 5 may be passed through the two holes and the drive chain. A nut can then be fastened to one side of the bolt, thereby fixing the crawler pad to the drive chain. Previously, each half of the crawler pad was separately bolted to the drive chain. This created extreme stress at the point of attachment in both the bolt and the pad. In the one piece crawler pad arrangement of the present invention, the stress between the bolt and pad in the prior art has been transferred to the solid portion of the central protrusion 4.

The pad is formed of iron or other appropriate material by casting. The central protrusion is preferably solid except for the two holes and a space allowing the crawler pad to fit over a link in the chain. In this embodiment the body portion and entire surface engaging portion are integral but they could be two separate pieces. If the surface engaging portion is separate from the body portion, it enables the use of different surface engaging portions suitable for different terrains.

Figure 3A:
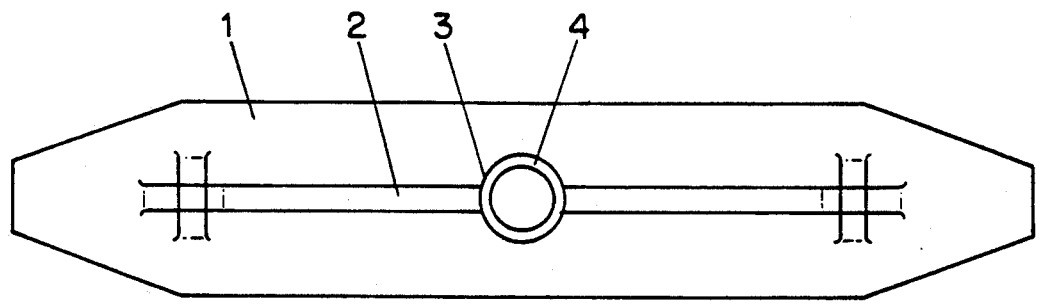
FIG. 3a is a top view of an embodiment of a one-piece crawler pad in accordance with the invention.
Figure 3B:
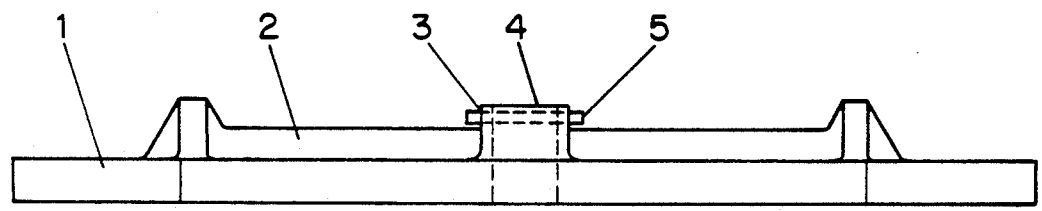
FIG. 3b is a horizontal view of an embodiment of a one-piece crawler pad.
Figure 3C:
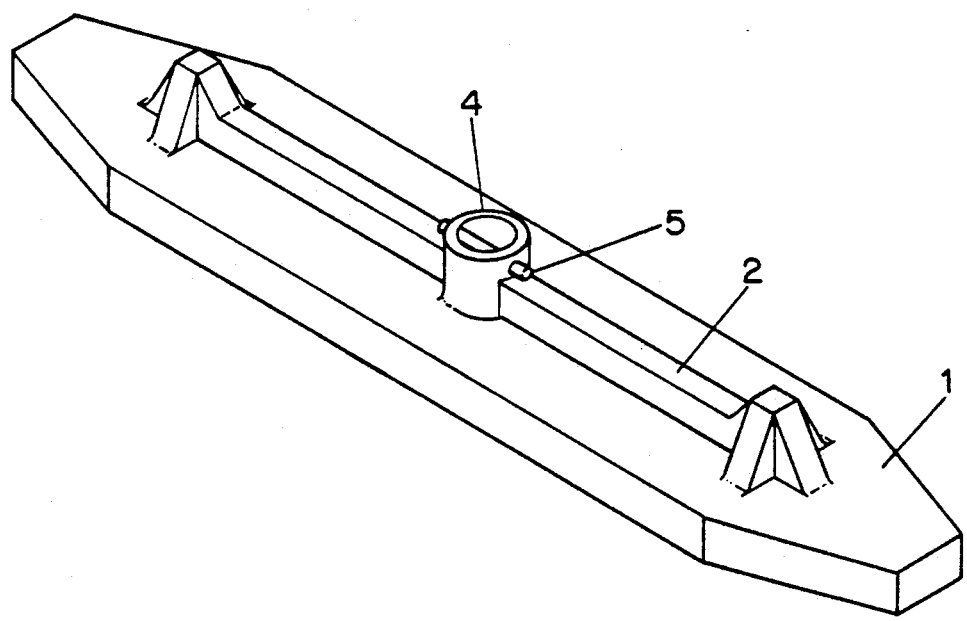
FIG. 3c is a perspective view of an embodiment of a one piece crawler pad.
Figure 3D:
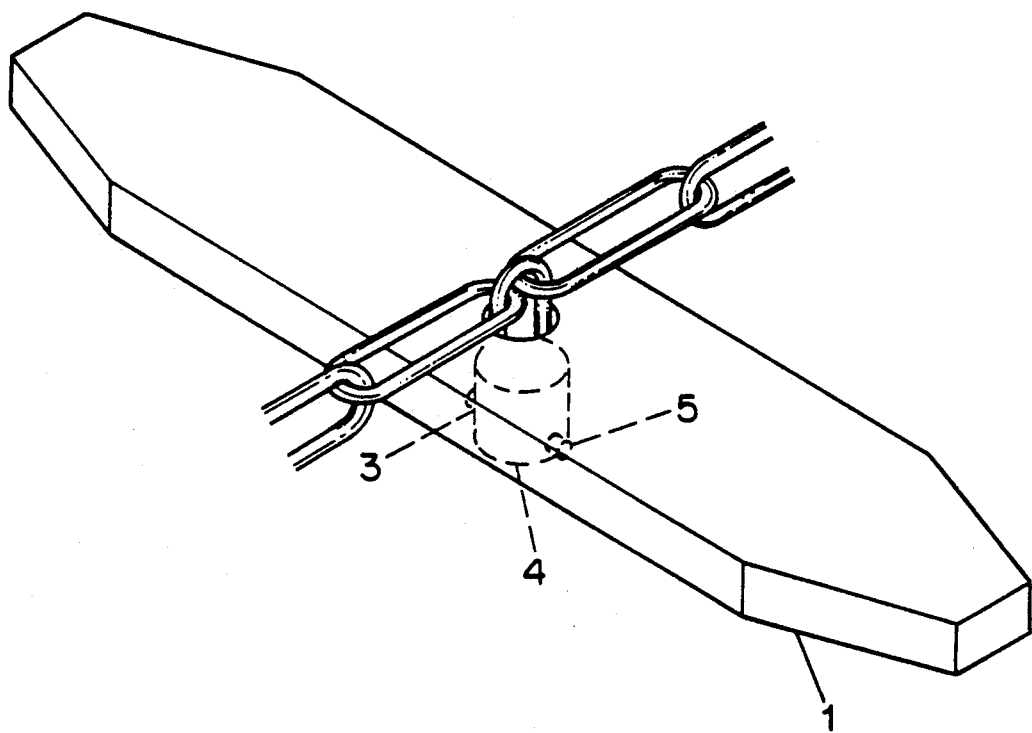
FIG. 3d is a perspective view of an embodiment of a one piece crawler pad showing the engagement of the drive chain to the crawler pad.

The surface engaging portion is raised and extends off the body portion. It is also narrower than the body portion. The purpose is to focus the pressure, created by the weight of the machine. When the pads are in place on the drive chain, and contacting the ground, they are oriented such that the surface engaging portion extends below the body portion. The weight of the machine forces the surface engaging portion to dig or sink into the ground. This provides a foothold (at each crawler pad location) for the drive chain so that as the drive chain is rotated, the mining machine is propelled. FIG. 3(a) shows that the surface engaging portion is sculpted on the ends, for example in a cross shape, to facilitate digging into the ground.

Of course the structure of the surface engaging portion could vary and such variations are within the scope of the present invention. The sculpted end is called a grouser. In the embodiment the grouser does not extend across the entire width of the pad, but is centrally located. Previously the grouser extended across the entire width of the pad and wrench access to the drive chain engaging means, necessary to bolt the pad to the drive chain, was severely limited. This new configuration enables wrench access to the central protrusion and drive chain engaging means.

While there has been described what is believed to be a preferred embodiment of the present invention, those skilled in the art will recognize that modifications to what has been specifically described can be made without exceeding the scope of this invention which is intended to claim all such changes and modifications or the like.

I claim:

1. A one piece crawler pad for use with a mining machine having a drive chain comprising:

(a) a substantially rectangular body portion having first and second narrow ends and first and second major surfaces;
(b) a surface engaging means disposed on said first major surface of said body portion; and
(c) a drive chain engaging means for attaching said crawler pad to a drive chain, centrally disposed between said first and second ends of said body portion, wherein said drive chain engaging means comprises a hollow protrusion extending from the first major surface and having two horizontally opposed, aligned, bolt holes formed therein, said protrusion having an interior open portion extending from and perpendicular to the first major surface and being sized to accept a link of the drive chain within the open portion such that a bolt passed through the opposed bolt holes will engage the link of the drive chain within the hollow protrusion.

2. A crawler pad according to claim 1 wherein the hollow protrusion has two sets of horizontally opposed, aligned bolt holes.

3. In a mining machine having a drive mechanism utilizing a plurality of crawler pads attached to a drive chain, the improvement comprising utilizing a plurality of one-piece crawler pads, each of which extends outwards at an angle of essentially 90° on both sides of the drive chain wherein each crawler pad comprises
(a) a substantially rectangular body portion having first and second narrow ends and first and second major surfaces;
(b) a surface engaging means disposed on said first major surface of said body portion; and
(c) a drive chain engaging means for attaching said crawler pad to a drive chain, centrally disposed between said first and second ends of said body portion, wherein said drive chain engaging means comprises a hollow protrusion extending from the first major surface and having two horizontally opposed, aligned, bolt holes formed therein, said hollow protrusion being sized to accept a link of the drive chain within the protrusion such that a bolt passed through the opposed bolt holes will engage the link of the drive chain within the protrusion.

* * * * *